Sept. 18, 1951 M. D. McSHURLEY 2,568,246
STACK ELEVATOR CONTROL MECHANISM
FOR COLLATING MACHINES
Filed Jan. 8, 1949 8 Sheets-Sheet 3

INVENTOR
MARSHALL D.
McSHURLEY
BY
HIS ATTORNEYS

Sept. 18, 1951  M. D. McSHURLEY  2,568,246
STACK ELEVATOR CONTROL MECHANISM
FOR COLLATING MACHINES
Filed Jan. 8, 1949  8 Sheets-Sheet 5

INVENTOR
MARSHALL D. McSHURLEY
BY
HIS ATTORNEYS

Sept. 18, 1951 M. D. McSHURLEY 2,568,246
STACK ELEVATOR CONTROL MECHANISM
FOR COLLATING MACHINES
Filed Jan. 8, 1949 8 Sheets-Sheet 6

INVENTOR
MARSHALL D. McSHURLEY
BY Spencer Hardman & Fehr
HIS ATTORNEYS

Patented Sept. 18, 1951

2,568,246

UNITED STATES PATENT OFFICE 2,568,246

STACK ELEVATOR CONTROL MECHANISM FOR COLLATING MACHINES

Marshall D. McShurley, Muncie, Ind., assignor to General Motors Corporation, Detroit, Mich., a corporation of Delaware Application January 8, 1949, Serial No. 69,925

3 Claims. (Cl. 270—58)

1

This invention relates to machinery for stacking storage battery plates and separators in correct order for assembly.

The application of Poole et al., Serial No. 673,574, filed May 31, 1946, discloses a machine for stacking in correct order all of the plates and separators required for a battery cell. For example, a machine for stacking the plates and separators for a cell of a 19-plate battery would have 37 magazines. By not filling all of the magazines of the machine, it can be used to stack the parts for battery cells requiring smaller numbers of plates and separators. It is economical to use such a machine where the quantities of each battery produced are relatively large.

An object of the present invention is to provide a stacking machine for use in the manufacture of batteries of various capacities where the quantity production of each item is relatively small. Each battery cell requires a stack of plate and separator parts whose number is one plus a multiple of four. The disclosed embodiment of the present invention automatically stacks elements in groups of four, namely, a separator, a positive plate, a separator and a negative plate. Therefore, the requirements of each cell can be obtained by stacking the required number of these groups and placing a negative plate on top of the stack. The machine comprises four magazines which receive respectively stacked separators, positive plates, separators and negative plates. Each stack rests on a platform which is lifted by an hydraulic step-by-step mechanism through a distance equal to the thickness of the elements in the stack. With each magazine, there is associated a transfer mechanism having vacuum cups which engage the top element of a stack by which the element is lifted and is then moved horizontally to a position in which the element is located vertically above an element receiving plate attached to a continuously moving conveyor. The transfer mechanisms are operated in timed relation to the movement of the conveyor and the vacuum at the cups is relieved in time for the elements to drop from the cups upon the plates of the conveyor. The transfer mechanism of the present machine is of the type disclosed in the Poole application referred to.

It is more particularly an object of the present invention to provide for the control of hydraulically operated apparatuses for elevating the platforms of the magazines.

Further objects and advantages of the present invention will be apparent from the following description, reference being had to the accompanying drawings, wherein a preferred embodiment of the present invention is clearly shown.

Figures 1, 2, 3, 4, 5:
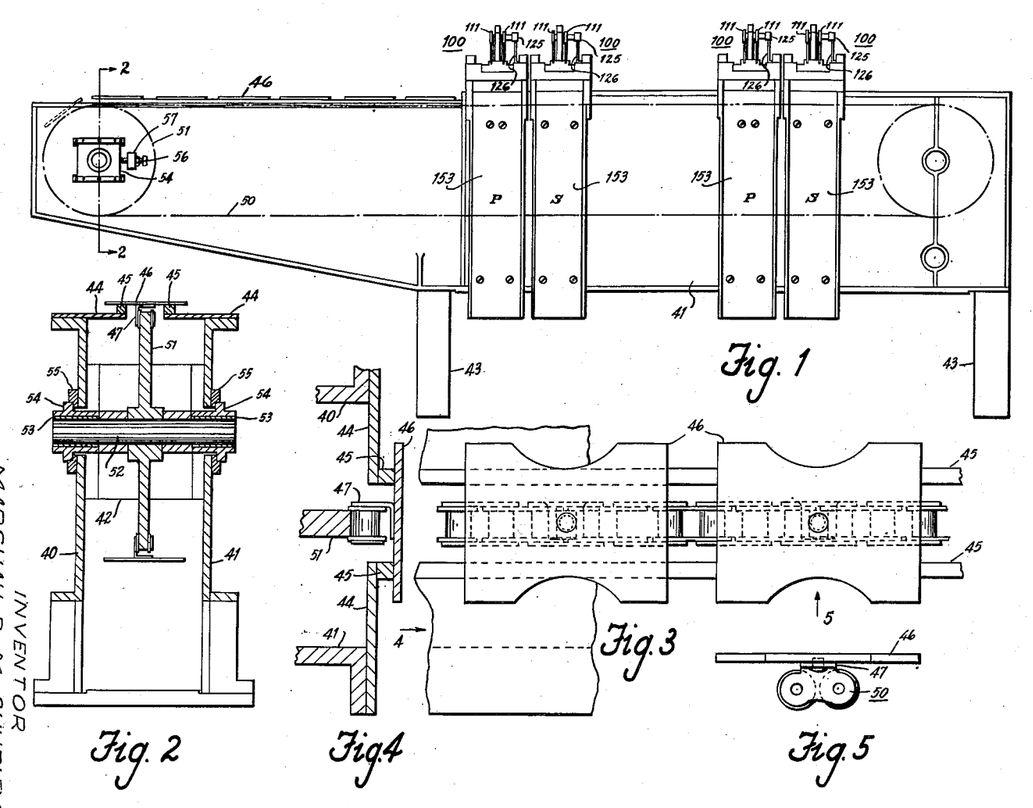
Fig. 1 is a side view of the frame of the machine omitting the hydraulically operated magazines.
Fig. 2 is a sectional view on line 2—2 of Fig. 1 and is drawn to a larger scale than Fig. 1.
Fig. 3 is a fragmentary plan view of the conveyor and is drawn to a larger scale than Fig. 2.
Figs. 4 and 5 are views in the direction of arrows 4 and 5 respectively of Fig. 3.

Referring to Figs. 1 to 6, the machine frame comprises side frames 40 and 41, joined by spacers 42 and supported above the floor by brackets 43. As shown in Fig. 2, frames 40 and 41 support plates 44 which support rails 45 upon which plates 46 are slidable. Each plate 46 is connected with an angle 47 provided by a link in a conveyor chain 50 which passes around a sprocket 51 attached to a shaft 52 journaled in bearings 53 provided by plates 54, supported for horizontal movement by rails 55 attached to the side frame. By turning a screw 56 threaded through a lug 57 integral with a side frame, a plate 54 can be moved for the purpose of taking up the slack in the chain 50 which in Fig. 1 is represented by dot-dash lines.

Figures 6, 7, 8, 9:
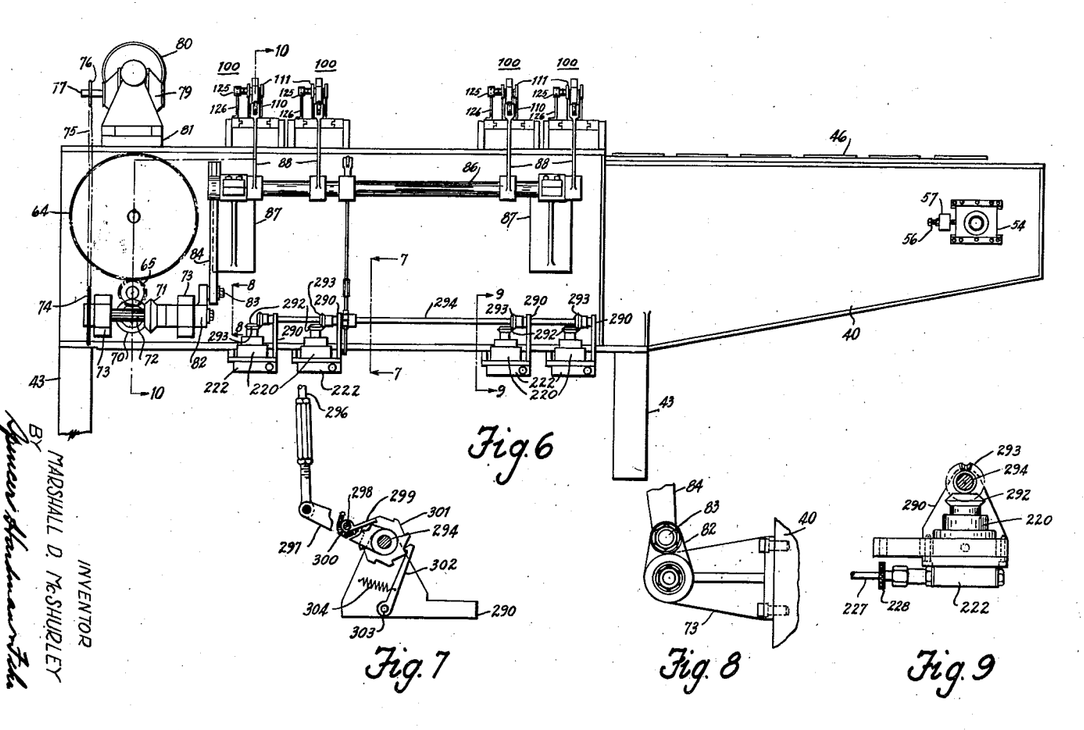
Fig. 6 is a side view of the machine opposite to that shown in Fig. 1.
Figs. 7, 8 and 9 are fragmentary views drawn to a larger scale than Fig. 6 and taken respectively on lines 7—7, 8—8 and 9—9 of Fig. 6.
Figures 10, 11, 12, 13, 14:
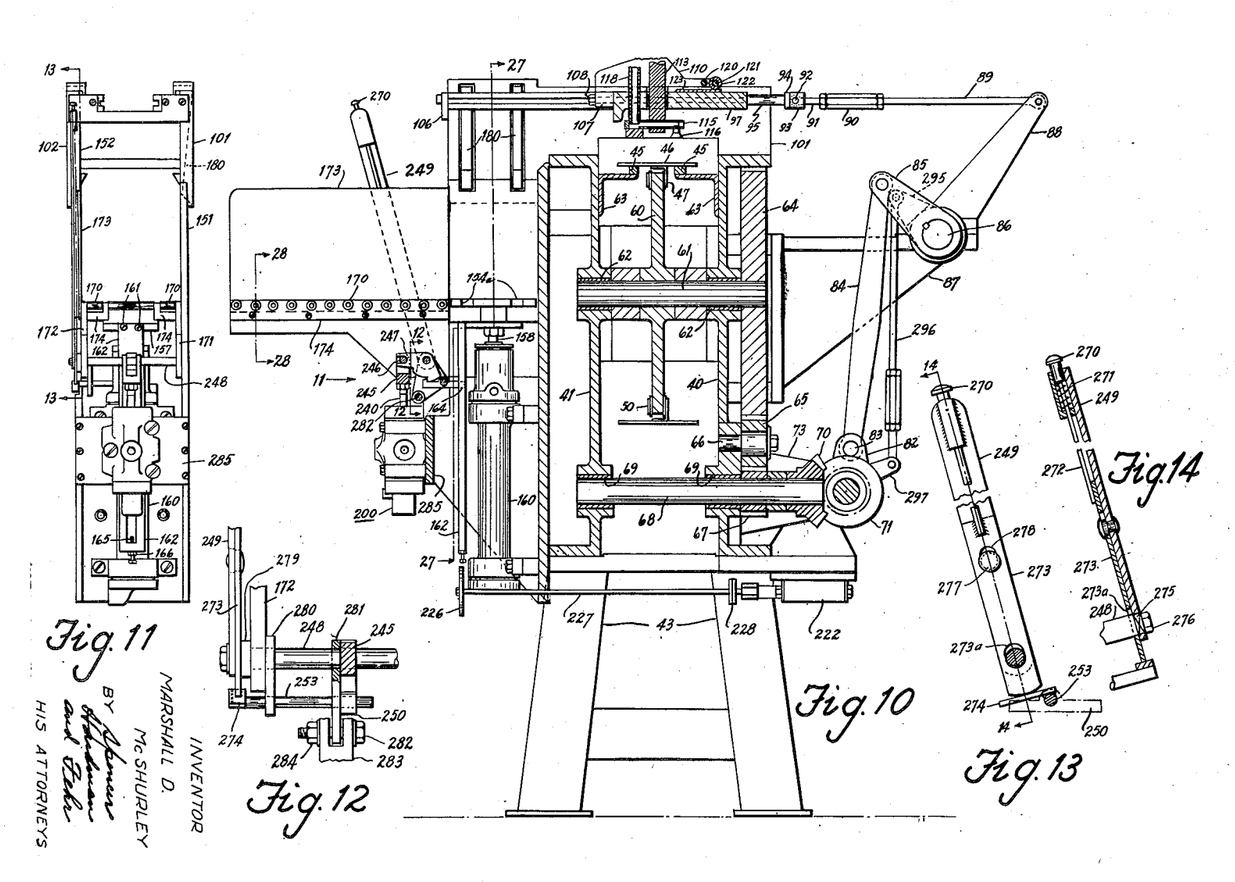
Fig. 10 is a sectional view on line 10—10 of Fig. 6 and is drawn to a larger scale.
Fig. 11 is a view in the direction of arrow 11 of Fig. 10.
Fig. 12 is a sectional view on line 12—12 of Fig. 10 and is drawn to a larger scale.
Fig. 13 is a sectional view on line 13—13 of Fig. 11 and is drawn to the same scale as Fig. 12.
Fig. 14 is a sectional view on the line 14—14 of Fig. 13.

As shown in Fig. 10, chain 50 passes around the driving sprocket 60 attached to shaft 61 which is journaled in bearings 62 supported by the frames 40 and 41 which support angles 63 which support the rails 45. Shaft 61 is connected with a gear 64 (Figs. 6 and 10) meshing with an idle gear 65 pivotally supported by a stud 66 attached to frame 40 and meshing with a gear 67 attached to a shaft 68 journaled in bearings 69 provided by frames 40 and 41. Shaft 68 is connected with a bevel gear 70 meshing with a bevel gear 71 which, as shown in Fig. 6, is attached to shaft 72 journaled in brackets 73 attached to frame 40. Shaft 72 is connected with a sprocket 74 which a chain 75 connects with a sprocket 76 attached to a shaft 77 which is driven by a motor 80 connected with shaft 77 through a speed reducer contained in a housing 79. The motor and speed reducer are combined in one unit which is supported by a plate 81 supported by the frames 40 and 41.

Shaft 72 is connected, as shown in Figs. 6 and 8, with a crank arm 82 carrying a pin 83 which a connecting rod 84 connects with a lever 85 connected with a shaft 86 journaled in brackets 87 supported by frame 40. Shaft 86 is connected with and supports four levers 88, each connected by a rod 89, turnbuckle 90, rod 91, pin 92 and ears 93 integral with a plate 94 forming a part of a transfer mechanism designated generally by numeral 100 (Figs. 15-25).

The plate 94 (Figs. 15-17) is attached to rods 95 which pass through holes 96 provided by a carriage 97 which has integral tongues 98 (see also Fig. 27) received by grooves in bars 99 supported by frame plates 101 and 102 which as shown in Fig. 10 are supported by frames 40 and 41.

Figures 15, 16, 17, 17A:
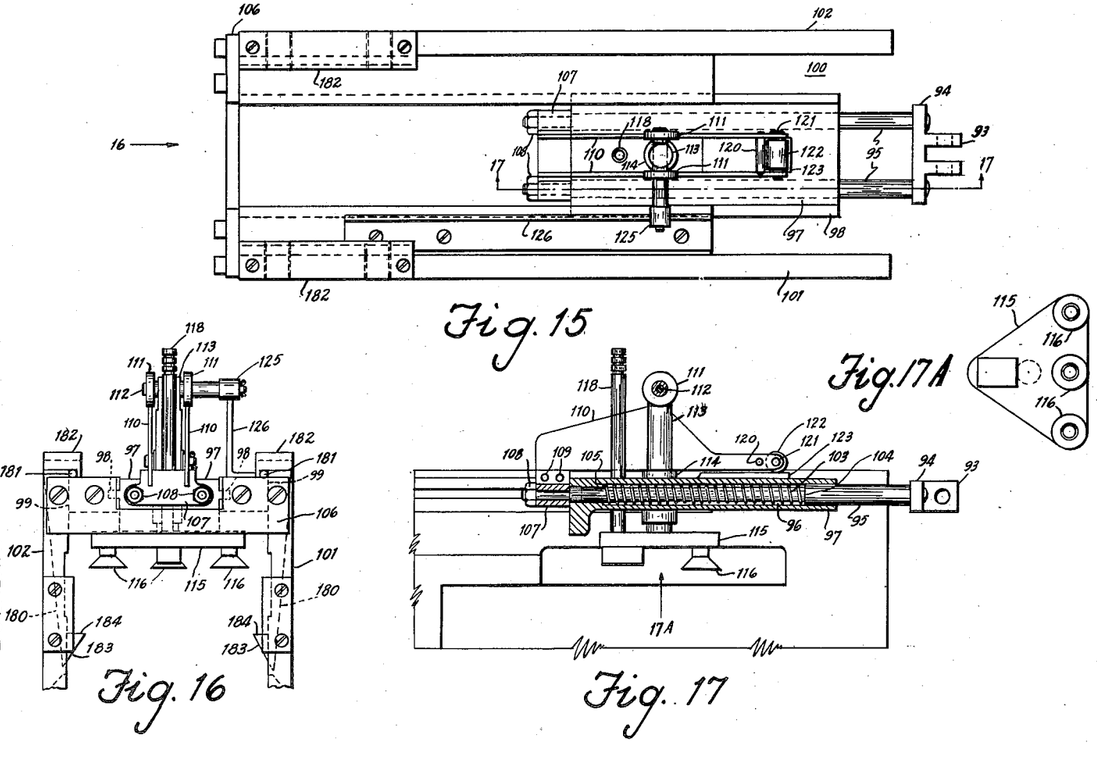
Fig. 15 is a plan view of one of the vacuum cup transfer mechanisms.
Fig. 16 is a view in the direction of arrow 16 of Fig. 15.
Fig. 17 is a sectional view on the line 17—17 of Fig. 15.
Fig. 17A is a view in the direction of arrow 17A of Fig. 17.

Rods 95 are surrounded by springs 103, each confined between a shoulder 104 of the rod and a shoulder 105 of the carriage 97 whereby left movement of the rods 95 causes left movement of the carriage, said movement being stopped when the carriage strikes a bar 106 attached to plates 101 and 102. Each rod 95 has a reduced portion which passes through a bar 107 and receives a nut 108, the tightening of which clamps the bar 107 against a shoulder of the rod 95. Bar 107 is connected by rivets 109 with cams 110 each engageable with a roller 111 which is pivotally supported by horizontal rod 112 passing through a vertical rod 113 guided by a bushing 114 provided by the carriage 97 and connected at its lower end with a plate 115 supporting flexible vacuum cups 116 and providing ducts, such as 117 (Fig. 27), by which the cups are connected with a pipe 118 which is connected with a vacuum pump in a manner to be explained later. As seen in Figs. 15 and 17, the cams 110 are connected together at the right ends by a spacing pin 120 and they support a pin 121 on which roller 122 is journaled. Roller 122 rides on a pad 123 provided by the carriage 97. The rod 112 which supports the cam engaging rollers 111 supports a roller 125 which is engageable with a rail 126 attached to one of the bars 99.

Figures 18, 19, 20, 21:
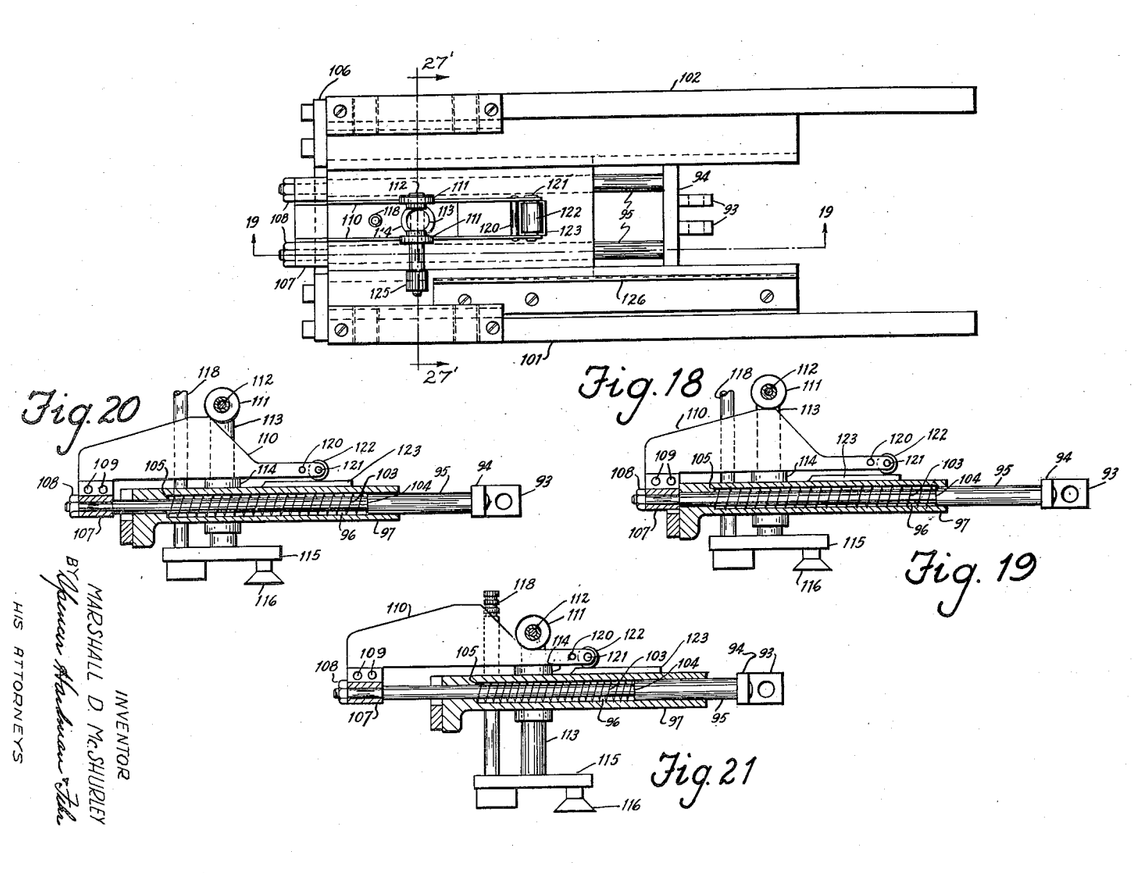
Fig. 18 is a view similar to Fig. 15 showing the transfer mechanism in a different position.
Fig. 19 is a sectional view on the line 19—19 of Fig. 18.
Figs. 20 and 21 are views similar to Fig. 19 showing other positions of the transferring mechanism.

The position of carriage 97 shown in Fig. 15, is the same as the position of the carriage in Fig. 10 and in that position, the vacuum cups 116 are vertically above a plate 46 of the conveyor. As the lever 88 moves counterclockwise the carriage 97 moves to the left and into the position shown in Fig. 18, in which it engages bar 106. After that, further counterclockwise movement of a lever 88 causes the rods 95 to continue their movement toward the left, thereby causing the cams 110 which are then engaged by the rollers 111 to allow said rollers 111 and the rod 113 to descend along them as shown in Figs. 20 and 21. The vacuum manifold 115 and cups 116 descend into the position shown in Fig. 21 so that the vacuum cups will contact the uppermost element (either in a separator or a plate) in a magazine below it. At that time the cups are subjected to vacuum. Consequently, during movement of lever 88 in a clockwise direction toward the position shown in Fig. 10, the cams 110 move to the right relative to the carriage 97 to lift the rollers 111 and parts supported thereby and then the carriage and cams move together to the right while roller 125 rides on track 126. When the cups and an element supported thereby have arrived at a location vertically above a conveyor plate 46, the vacuum at the cups has been relieved by operation of a valve to be described; and the element descends from the cups upon a conveyor plate 46.

The center-line spacing of the conveyor plates or workholders 46 equals the center-line spacing between closely adjacent transfer mechanisms 100 (Fig. 6); and the center-line spacing of the intermediate transfer mechanisms 100 equals three times the center-line spacing of plates 46. The wider spacing between intermediate mechanisms 100 is mainly for the convenience of the attendant who loads the magazines with which the transfer mechanisms are respectively associated. The motion of lever 88 is so timed to the motion of the conveyor that lever 88 has reached the position shown in Fig. 10 as plate 46 has moved directly under the vacuum cups of the transfer mechanism.

Figures 22, 23, 24, 25, 26:
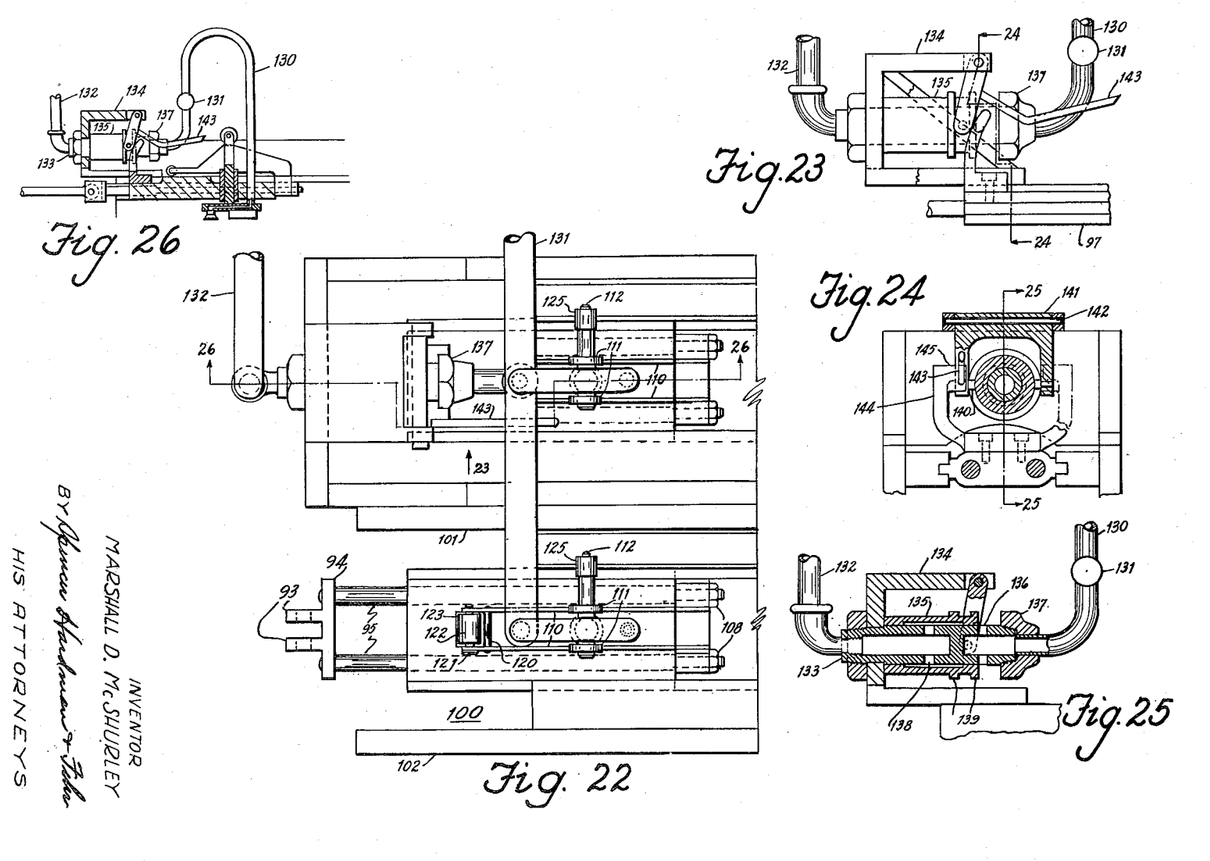
Fig. 22 is a fragmentary plan view of two adjacent transfer mechanisms.
Fig. 23 is a view in the direction of arrow 23 of Fig. 22, showing a vacuum controlling valve.
Fig. 24 is a sectional view on line 24—24 of Fig. 23.
Fig. 25 is a sectional view on line 25—25 of Fig. 24.
Fig. 26, smaller in scale than Fig. 22, is a view partly in section on line 26—26 of Fig. 22.

Referring to Figs. 22–26, the pipes 118 of the transfer mechanisms are connected by flexible tubes 130 with a manifold 131 which is either vented or is connected with a pipe 132 (connected with a vacuum pump not shown) by a valve having a fixed tubular body 133 attached to a bracket 134 attached to plates 101 and 102 and providing a guide for a movable valve sleeve 135 which, in the position shown in Fig. 25, uncovers a port 136 so that manifold 131 and all the vacuum cups of the four transfer mechanisms are vented. Valve 135 is movable between a vertical wall of bracket 134 and a coupling nut 137; and, when against the nut 137, valve 135 provides a connection between port 136 and a port 138 so that manifold 131 is unvented and is connected with pipe 132.

Valve 135 has a groove between flanges 139 for receiving pins 140 carried by a lever 141 pivoted on a pin 142 supported by bracket 134. Lever 141 carries a rod 143. One of the carriages 97 supports a bracket 144 having lugs 145 for engaging lever 141 to move it into the position shown in Figs. 23, 24 and 26 by the time the vacuum cups, supported by all the carriages, are vertically above conveyor plates 46, in consequence of which, the cups release the elements and they gravitate substantially simultaneously upon conveyor plates 46. As the carriages 97 move right in Fig. 22 and left in Fig. 10, a lug 145 of bracket 144 engages the rod 143 to effect counterclockwise movement of lever 141 (Figs. 23 and 25) to effect right movement of valve sleeve 135 to the position for covering port 136 and for connecting it with port 138 so that vacuum will be established at all the vacuum cups.

Figures 27, 28, 29, 30:
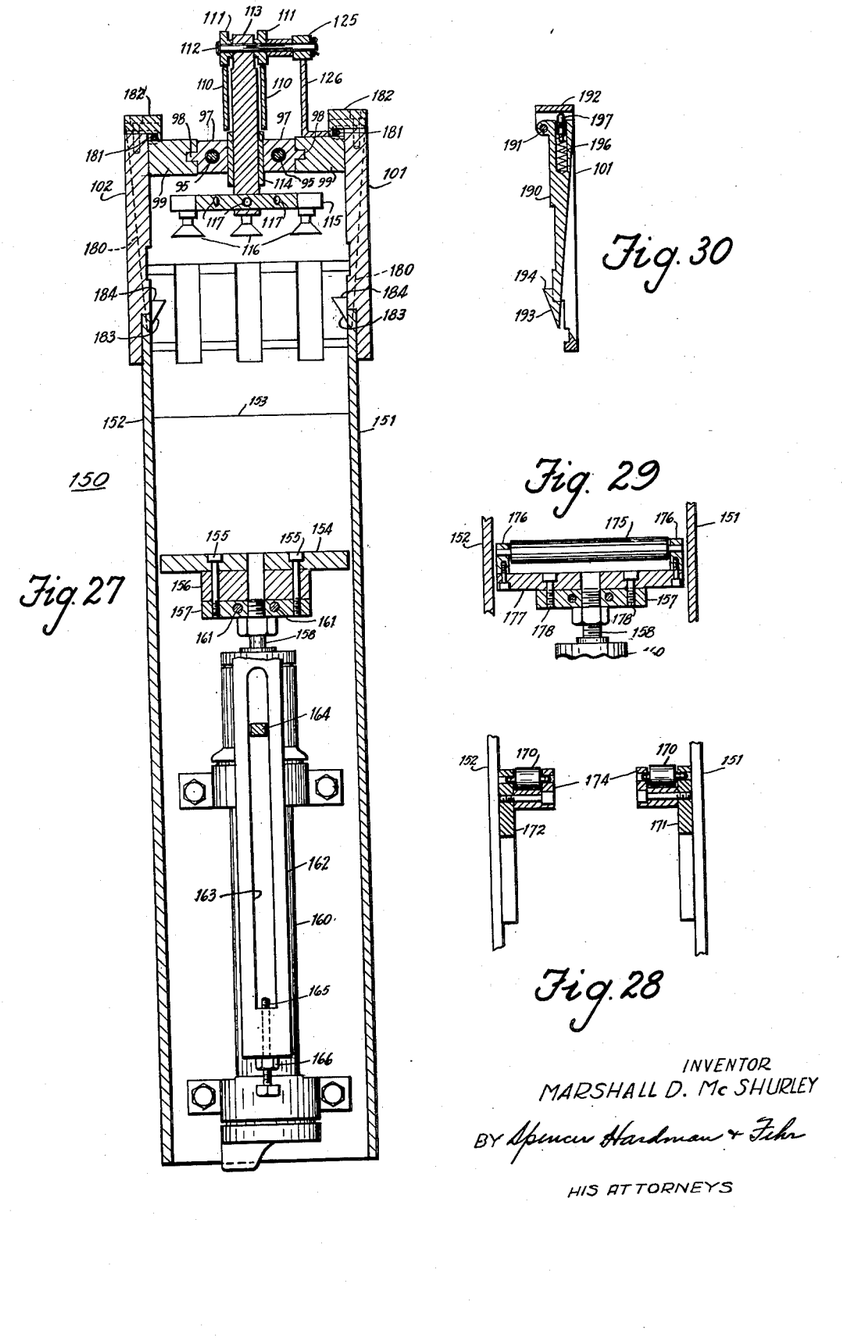
Fig. 27 is a sectional view on the line 27—27 of Fig. 10 and is drawn to the same scale as Figs. 15 through 19, and the upper part of Fig. 27 is on the line 27'—27' of Fig. 18.
Fig. 28 is a sectional view on the line 28—28 of Fig. 10.
Fig. 29 is a sectional view similar to the middle portion of Fig. 27 and shows the construction of the platform which supports the plates whereas the platform of Fig. 27 adjacent thereto supports separators.
Fig. 30 is a sectional view on the line 30—30 of Fig. 10, showing a plate engaging latch whereas the corresponding part of Fig. 27 is used for engaging separators.

Referring to Figs. 10, 11, 27, 28 and 29, each magazine unit 150 comprises side plates 151, 152 which are secured to a back plate 153. As shown in Fig. 1, each back plate 153 is secured to frame 41. Plates 101—102 of the transfer mechanism 100 provide continuation respectively of the plates 151 and 152. In Fig. 1, the letters "S" designate location of the separator magazines and the letters "P" the location of the plate magazines. The separator magazine (Fig. 27) includes a plate 154 which screws 155 attach to plates 156 and 157, the latter being attached to rod 158 and connected with a piston 159 (Fig. 31) in a cylinder 160 which is supported by the back plate 153. Screws 161 (Figs. 11 and 27) attach to the plate 157, a plate 162 having a slot 163 receiving a lever 164. Lever 164 is engageable with a screw 165 threaded through the lower end portion of plate 162 and secured in the desired position of adjustment of nut 166. In a manner to be described, the platform 154 which receives separators is elevated intermittently the distance of the thickness of one separator and when the platform 154 is being elevated a certain distance, the screw 165 engages the lever 164 and operates it in a manner which causes the piston in cylinder 160 to move down to lower the platform 154 into position for reloading. Prior to reloading the platform, a stack of separators is placed upon rollers 170 (Fig. 10) which plates 171, 172 attach respectively to plates 151 and 152. In order to align the separators properly for reception between the plates 151 and 152, the stack of separators is pushed to the left (Fig. 11) against the plates 173. The stack is then pushed from rollers 170 and upon the platform 154. Rollers 170 are journaled at one end in a plate 171 or 172 and at the other in a bar 174 attached to a plate 171 or 172 as shown in Fig. 28. As shown in Fig. 29, the platform of a plate magazine unit is a series of closely spaced rollers 175, journaled in bars 176 attached to a plate 177 which screws 178 attach to plate 157 attached to a piston rod 158.

In order that there will be a reserved supply of several elements left adjacent the vacuum cups when the platform is lowered for reloading, latch levers 180 (Fig. 27) pivoted on rods 181 (retained by plates 182 attached to plates 101, 102) are provided. As the separators move up they engage oblique surfaces 183 of these levers and spread them apart so that there will be several separators located above the substantially horizontal portions 184 of these levers. Therefore when the platform 154 is lowered, the surfaces 184 of levers 180 move under the last platform-supported separator which the platform had carried just before it was lowered. The platform 154 is notched at 154a (Fig. 10) so as to permit the levers 180 to move toward each other after this last separator has moved slightly above the surfaces 184. No springs are required to returned the levers 180 to the position shown in Fig. 27 because the centers of gravity of these levers are so located as to cause them to return to normal position unaided by springs. The plate magazines have similar latch levers 190 supported by pins 191 which are retained by the plates 192 attached to plates 101 and 102. Levers 190 have oblique surfaces 193 and horizontal surfaces 194 corresponding respectively to surfaces 183 and 184 of levers 180. In case of the latch levers 190 for the separators, it has been found desirable to provide each with a spring 196 pushing downwardly against the lever and upwardly against a pin 197 bearing against plate 192 because freedom of rotation of a lever 190 might be interfered with by corrosion which might be present due to the proximity of paste on the plate. The bars 176 supporting rollers 175 are provided with notches similar to notches 154a of plate 154 in order that levers 190 may swing toward the normal position when the top-most roller supported plate is slightly above the horizontal surfaces 194 of lever 196.

The hydraulic circuit associated with each cylinder 160 will now be described with reference to Fig. 31. There is a main control valve 200 having inlet ports 201 and 202 which pipe 203 connects with an oil pressure pump and exhaust or drain ports 204 and 205 which a pipe 206 connects with a tank of which the inlet of the pump is connected. There is an outlet port 207 which pipe 208 connects with the upper end of the cylinder 160 and an outlet port 209 which a pipe 210 connects with the lower end of the cylinder 160. There is also an outlet port 211. A pipe 212 connects with port 213 of a valve 220 having ports 215 and 216 connected together and through a ball check valve CV with pipe 210. Ports 217 and 218 are connected together and by pipe 221 with one end of a metering cylinder 222. Port 219 is connected by pipe 223 with the other end of said cylinder. A disc on piston 224 is movable between the right end of the cylinder 222 and a screw 225, which is turned by turning a hand-wheel 226 (Fig. 10) connected with the screw 225 by rod 227 and a coupling 228. The movable part of valve 220 is a disc 230 having passages 231, 232 located in the same plane and having passages 233, 234 at right angles to passages 231 and 232 and in a plane different from the plane of passages 231, 232. The movable valve member 240 of valve 210 has lands 241, 242 and 243 and it is urged upwardly by a spring 244, said upward pressure being communicated through a clevis 245 to a pin 246 which is received by a notch in lever 247 attached to a shaft 248 attached to a lever 249. Spring 244 tends to effect clockwise rotation of levers 247 and 249, said motion being resisted, when lever 249 is in the position shown in Fig. 31, by a lever 250 attached to a shaft 253 and urged clockwise by a spring 254, said lever having a hook portion 251 engaging a surface 252 of lever 247.

Figures 31, 32, 33, 34:
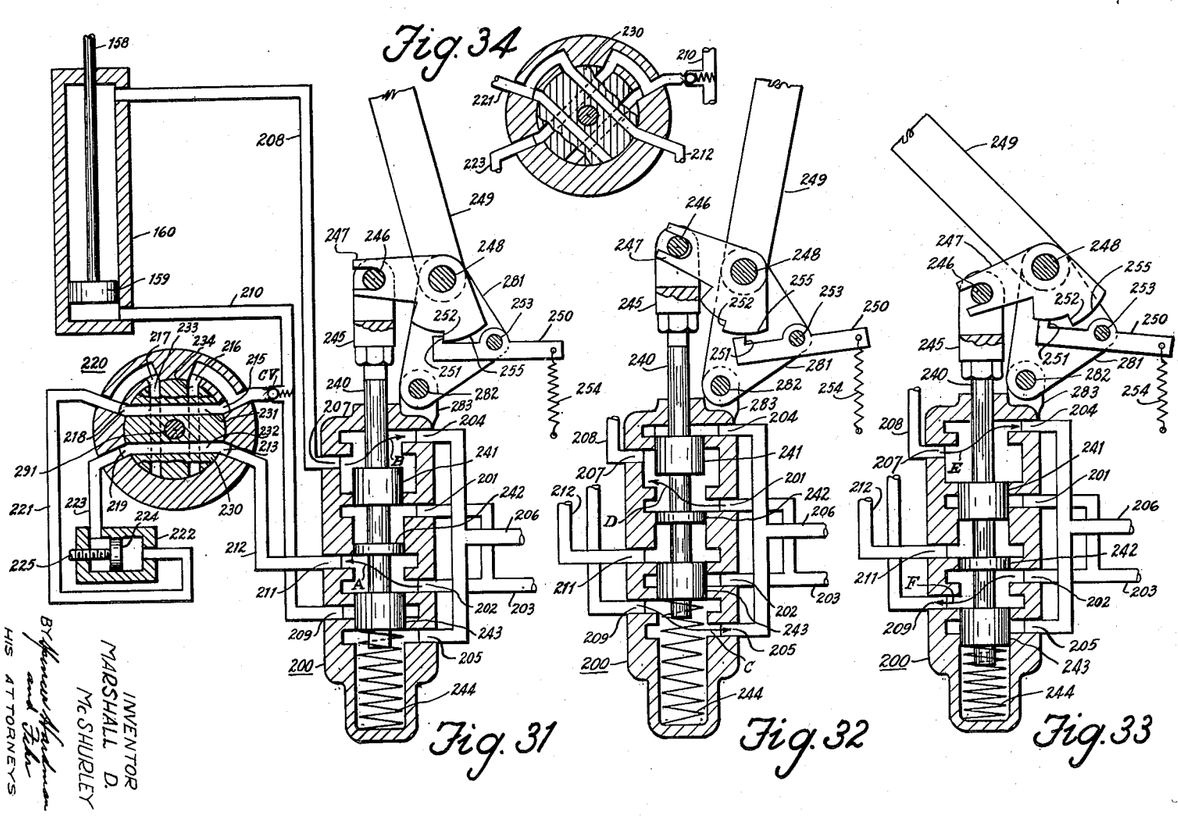
Fig. 31 is a diagram of an hydraulic circuit which includes a valve 240.
Figs. 32 and 33 show other positions of valve 240.
Fig. 34 shows a position of a reversing valve 230 different from that shown in Fig. 31.

When the valve 240 is in the position shown in Fig. 31, pressure fluid will flow from pipe 203 through ports 202, 211, port 213 of valve 220, passage 232, port 219, pipe 223 to the left end of the metering cylinder 222 thereby causing right movement of the piston 224 whereby a predetermined quantity of oil is forced out through pipe 221 and thence through port 218, passage 231, ports 215, check valve CV and pipe 210 to the lower end of the cylinder 160 to cause the piston 159 to be displaced a distance corresponding to the volume of oil which has been included between the piston 224 and the right wall of the cylinder 222. The movement of piston 224 is so adjusted by turning the screw 225 that the piston 159 will lift the magazine platform the distance of the thickness of one element thereon. The apparatus shown in Fig. 31 is the same for the plate and separator magazines. Since the separators are thinner than the plates, the distance between the right end of the screw 225 and the inner wall of cylinder 222 would be less in the case of the separator magazine than in the case of the plate magazine. During each machine cycle which includes a reciprocation of the transfer carriage and a movement of the conveyor workholder plates, the valve member 230 is moved 45° in order to reverse, as shown in Fig. 34, the connections of cylinder 222 with respect to pipes 210 and 212. As soon as the reversal is made, the metering piston 224 moves left and another increment of hydraulic fluid is forced into the lower end of the cylinder 160. Consequently, by a step-by-step application of a measured amount of pressure fluid, the stack of elements in a magazine is lifted so that the topmost element is in the stack will be at the proper elevation to be engaged by the vacuum cups of the transfer mechanism. In Fig. 31, arrow A indicates flow of pressure fluid in valve 200 and arrow B, the flow of fluid being forced from the upper end of cylinder 160.

At the time when there are still several elements in the magazine sufficient for a reserve supply during reloading of a magazine, the screw 165 (Fig. 27) has been elevated to such height that it will cause lever 250 to move into the position shown in Fig. 32 whereupon the spring 244 pushes the valve member 240 to the position shown so that the lower end of the cylinder 160 is connected by drain as indicated by arrow C and the upper end thereof is connected with pressure pipe 203 as indicated by arrow D. Piston 159 and the magazine platform supported thereby descends rapidly to loading position. Lever 250 is moved clockwise by spring 254 until its left end engages the surface 255 of the lever 247. The position of lever 249 in Fig. 32 indicates to the attendant that the platform is down for reloading. He reloads the platform and moves the lever 249 to the position shown in Fig. 33, thereby moving the valve member 240 to its lowermost position. This causes the upper end of cylinder 160 to be connected with drain as indicated by arrow E and the lower end of the cylinder to be connected with pressure pipe 203 as indicated by arrow F. Piston 159 moves up so as to close the gap between the stack supported by the magazine platform and the reserve supply of elements supported by the latch levers 180 or 190. Then the operator releases the lever 249 and the spring 244 returns the valve 240 to the position shown in Fig. 31, the hook 251 of lever 250 again engaging the surface 252 of lever 247.

In case it is desired to move lever 249 into the position shown in Fig. 32 without waiting for lever 250 to be moved into unlatched position automatically, the operator will push down on a button 270 (Fig. 13) against the action of a restoring spring 271, thereby moving downwardly a rod 272 and a bar 273 to cause it to engage a plate 274 attached to shaft 253 and to effect counterclockwise movement of lever 250. As shown in Fig. 14, the shaft 248 has a square portion 275 received by a square hole in the lever 249 which is retained by nut 276 threadedly engaging an end portion of shaft 248. The bar 273 has an elongated hole 273a which receives the shaft 248 which therefore limits the movement of bar 273. Bar 273 is retained alongside the lever 249 by the head of a stud 277 attached to lever 249 and having a shank portion received by an elongated hole 278, of bar 273. As shown in Fig. 11, the shaft 248 is journaled in bearings provided by plates 171 and 172. A spacer 279 (Fig. 12) is located between the plate 172 and the bar 273. The shaft 253 is journaled in a bearing provided by plate 280 attached to plate 172 and in a bearing provided by a plate 281 which receives the shaft 248 and a screw 282 which, as shown in Figs. 12 and 31, passes through ears 283 provided by valve 200 and is retained by nut 284. The plate 281 establishes a definite location between the centers of shafts 248 and 253 and the screw 282 and therefore a definite location of valve 200 relative to the shaft 248. As shown in Fig. 10, valve 200 is secured to a plate 285 which is supported by plates 151 and 152.

The four reversing valves 220 and metering cylinders 222 of the four magazine units are shown in Fig. 6. There are four brackets 290 attached to frame 40, each supporting reversing valve 220 and metering cylinder 222. Each valve member 230 (Fig. 31) is connected with a shaft 291 to which is attached a beveled gear 292 (Fig. 6) meshing with bevel gear 293 attached to a shaft 294. Shaft 294 is turned intermittently 45° by a mechanism which includes a lever 295 (Fig. 10) connected with the shaft 86 connected by an adjustable link 296 with a lever 297 which, as shown in Fig. 7, is pivotally supported by shaft 294. Lever 297 carries a pin 298 pivotally supporting a pawl 299 which a spring 300 urges against a ratchet 301 attached to shaft 294. Lever 297 will be moved down from the position shown in Fig. 7 sufficiently for the pawl to drop behind a ratchet tooth while a retaining pawl 302 prevents counterclockwise rotation of the ratchet. Pawl 302 is supported by a pin 303 attached to a bracket 290 and urged counterclockwise by a spring 304. The upward movement of the lever 297 is sufficient to cause 45° clockwise rotation of ratchet 301. Hence the four reversing valves are indexed simultaneously while the four transfer mechanisms are carrying elements from the magazines to workholder plates of the conveyor. Therefore by the time these elements have dropped upon the conveyor plates, the magazine platforms will have been elevated distances equal to the thickness of the elements supported thereby.

From the foregoing description, it is apparent that the present machine provides a conveyor and transfer mechanism operating in timed relation, magazines each having a platform supporting a stack of elements and an hydraulic servo for raising the platform, each servo being controlled for step-by-step elevation of the platform by a main control valve in conjunction with a pressure fluid metering device which is controlled by a reversing valve operated in timed relation to the transfer mechanism. In response to elevation of the platform a predetermined distance, the main control valve is operated automatically to cause the servo to lower the platform for reloading. The main control valve can be manually operated for this purpose without waiting for automatic operation to take place. The main control valve is manually operated for the purpose of causing the servo to lift the loaded platform so that the uppermost element of the stack thereon engages the lowermost element of the reserve supply at the top of the magazine.

While the embodiment of the present invention as herein disclosed, constitutes a preferred form, it is to be understood that other forms might be adopted.

What is claimed is as follows:

1. A machine for stacking different parts in a certain order comprising a plurality of magazines each having a vertically movable platform upon which a stack of like parts is placed, a conveyor, part holders moved thereby, transfer devices each operative to cause the uppermost part on a stack to be transferred to a holder, a mechanism for effecting movement of the holders by the conveyor and operation of the transfer devices in timed relation whereby, during each cycle of operation of the machine, the parts are transferred to positions to be received by the holders as the holders are located by the conveyor to receive the parts, a plurality of pressure fluid operated servos for raising and lowering the platforms, each servo comprising a piston connected with a platform and a cylinder into one or first end of which pressure-fluid is admitted to effect raising the platform and into the other or second end of which pressure-fluid is admitted to effect lowering the platform, a first controller for each servo for passing a predetermined quantity of pressure-fluid from a pressure-fluid source to the first end of the cylinder to effect elevation of the platform a distance equal to the thickness of the parts thereon, a mechanism operated by the first mechanism for causing operation of the first controller once during each cycle of machine operation whereby the platform is elevated by step-by-step movement, a by-pass around the first controller to the first end of the cylinder, a second controller including a valve having a movable element having three positions, namely, an intermediate position which conditions the valve for connecting the first controller with a fluid-pressure source and the second end of the cylinder with drain, one end or second position which conditions the valve for connection of the first end of the cylinder with drain and the second end of the cylinder with the pressure source so that the platform is lowered and another end or third position which conditions the valve for correction of the pressure source with the by-pass to the first end of the cylinder and the other end of the cylinder with drain so that the platform is raised independently of control by the first controller, a spring urging the element toward second position, a manually operable lever connected with the element for manual operation thereof and operated by the spring, a latch engaging the lever to prevent movement of the element by the spring past intermediate position toward second position, means operating in response to elevation of the platform to a certain level for retracting the latch to permit the spring to move the valve from intermediate to second position, to effect lowering the platform, manually controlled means for retracting the latch to effect lowering of the platform when desired, said lever being manually operated to cause the valve element to move to intermediate position or past intermediate position to third position, release of the lever permitting said spring to move the valve from third to intermediate position in which it is retained by said latch, and means in each magazine and located adjacent to the transfer device associated therewith for retaining a number of parts sufficient to supply the transfer device while the platform of the magazine is lowered, loaded and raised.

2. A machine for stacking different parts in a certain order comprising a plurality of magazines each having a vertically movable platform upon which a stack of like parts is placed, a conveyor, means for moving the conveyor, a plurality of part holders adapted to be moved by the conveyor, a plurality of transfer devices each operative to cause the uppermost part on a stack to be transferred to a part holder, a mechanism for effecting movement of the part holders by the conveyor and operation of the transfer devices in timed relation whereby, during each cycle of operation of the machine, the parts are transferred to positions to be received by the part holders as the holders are located by the conveyor to receive the parts, a plurality of pressure fluid operated servos for raising and lowering said platforms, a controller for each servo having means for causing application of a predetermined quantity of pressure fluid to the servo to cause it to raise a platform a distance equal to the thickness of the parts thereon, control mechanism operated by the first mechanism for causing timed operation of each of said control means once during each cycle of machine operation whereby each platform is elevated by a step-by-step movement upon each cycle of operation, a second group of controllers for said servos for causing operation thereof independently of said first controllers, means associated with each magazine for holding a small supply of parts at upper limiting position adjacent the transfer device during reloading of the platform, including pressure-fluid by-passes respectively around the first controller and manually operated means associated with each of said second controllers for admitting pressure fluid through a by-pass to the servo to effect upward movement of the platform in order to lift the stack of parts placed thereon into contact with parts retained whereby normal step-by-step operation of the platforms is reinstated.

3. A machine for stacking different parts in a certain order comprising a plurality of magazines each having a vertically movable platform upon which a stack of like parts is placed, a conveyor, means for moving the conveyor, a plurality of part holders adapted to be moved by the conveyor, a plurality of transfer devices each operative to cause the uppermost part on a stack to be transferred to a part holder, a mechanism for effecting movement of the part holders by the conveyor and operation of the transfer devices in timed relation whereby, during each cycle of operation of the machine, the parts are transferred to positions to be received by the part holders as the holders are located by the conveyor to receive the parts, a plurality of pressure fluid operated servos for raising and lowering said platforms, a controller for each servo having means for causing application of a predetermined quantity of pressure fluid to the servo to cause it to raise a platform a distance equal to the thickness of the parts thereon, control mechanism operated by the first mechanism for causing timed operation of each of said control means once during each cycle of machine operation whereby each platform is elevated by a step-by-step movement upon each cycle of operation, a second group of controllers for said servos for causing operation thereof independently of said first controllers, means operatively connected with each magazine for retaining parts at the upper portion thereof adjacent the transfer device to supply it during reloading the platform, pressure-fluid by-passes, respectively, around the first controllers for each of said second controllers and having a movable element with three positions, namely, an intermediate position which conditions said second controller for admission of pressure fluid to the first controller, a second position on one side of intermediate position which conditions the second controller for cessation of flow of pressure fluid to the first controller and for admission of pressure fluid to the servo to cause it to lower the platform, and a third position on the other side of intermediate position which conditions the second controller for admission of pressure-fluid through a by-pass to the servo to cause it to raise the platform, a spring for each second controller urging the movable element from intermediate to second position, a latch normally operating to prevent movement of the element from intermediate position, to second position, means responsive to elevation of the platform to a certain level for retracting the latch whereby the element is moved by the spring from intermediate to second position, and a manually operable means for moving the element through intermediate position to third position, release of said manually operable means permitting return by said spring of the element from third to intermediate position in which the element is retained by the latch.

MARSHALL D. McSHURLEY.

REFERENCES CITED

The following references are of record in the file of this patent:

UNITED STATES PATENTS

| Number | Name | Date |
| --- | --- | --- |
| 794,146 | Ericson | July 4, 1905 |
| 2,137,381 | Blackstone | Nov. 22, 1938 |
| 2,247,466 | Baker et al. | July 1, 1941 |
| 2,295,055 | Rupp et al. | Sept. 8, 1942 |
| 2,435,915 | Williams | Feb. 10, 1948 |
| 2,479,060 | Davidson | Aug. 16, 1949 |